(12) United States Patent
Arrigoni et al.

(10) Patent No.: US 9,091,447 B2
(45) Date of Patent: Jul. 28, 2015

(54) OVEN MUFFLE AND OVEN

(75) Inventors: Giancarlo Arrigoni, Cassacco (IT); Fabrizio Dolce, Udine (IT); Stefano Toppan, Cordenons (IT)

(73) Assignee: ELECTROLUX HOME PRODUCTS CORPORATION N.V., Brussel (BE)

( * ) Notice: Subject to any disclaimer, the term of this patent is extended or adjusted under 35 U.S.C. 154(b) by 229 days.

(21) Appl. No.: 13/696,410

(22) PCT Filed: Jun. 1, 2011

(86) PCT No.: PCT/EP2011/002695
§ 371 (c)(1), (2), (4) Date: Feb. 21, 2013

(87) PCT Pub. No.: WO2011/160761
PCT Pub. Date: Dec. 29, 2011

(65) Prior Publication Data
US 2013/0201657 A1 Aug. 8, 2013

(30) Foreign Application Priority Data
Jun. 26, 2010 (EP) .................................. 10006651

(51) Int. Cl.
*F24C 15/00* (2006.01)
*F21V 8/00* (2006.01)

(52) U.S. Cl.
CPC ............ *F24C 15/008* (2013.01); *G02B 6/0006* (2013.01); *G02B 6/0008* (2013.01); *G02B 6/0048* (2013.01)

(58) Field of Classification Search
None
See application file for complete search history.

(56) References Cited

U.S. PATENT DOCUMENTS

2006/0049188 A1* 3/2006 Gramlich et al. ............. 219/723
2009/0272136 A1* 11/2009 Knoll et al. .................... 62/251
2009/0316385 A1   12/2009 Weber et al.
2010/0028991 A1*  2/2010 McCall ...................... 435/292.1

FOREIGN PATENT DOCUMENTS

| DE | 4100605    | 7/1992  |
| DE | 10318860   | 11/2004 |
| EP | 0922910    | 6/1999  |
| EP | 1923621    | 5/2008  |
| EP | 2128526    | 12/2009 |
| FR | 2826707    | 1/2003  |
| WO | 2009132954 | 11/2009 |

OTHER PUBLICATIONS

International Search Report for PCT/EP2011/002695, dated Dec. 12, 2011, 3 pages.

* cited by examiner

*Primary Examiner* — Ashok Patel
(74) *Attorney, Agent, or Firm* — Pearne & Gordon LLP

(57) ABSTRACT

The present application in particular is directed to an oven muffle (1) comprising a lighting system (3). The lighting system (3) comprises a light source (6) and a light guide (4) attached to the outer surface of the oven muffle (1), the light guide (4) has at least one light guiding tube (4) arranged and adapted to couple light of the light source (6) into the light guiding tube (4), wherein the light guiding tube (4) extends in parallel to the light guiding direction along a respective wall (5) from a light tube exit window to its light tube face side, preferably lying beyond a respective edge of the wall (5).

15 Claims, 4 Drawing Sheets

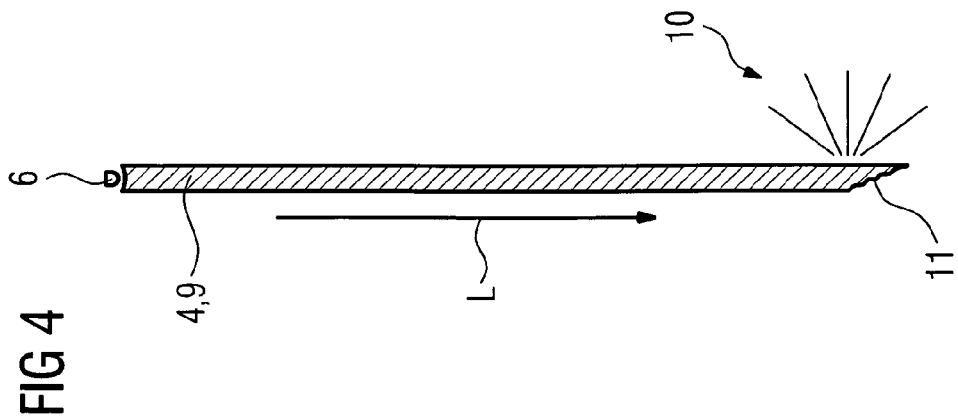
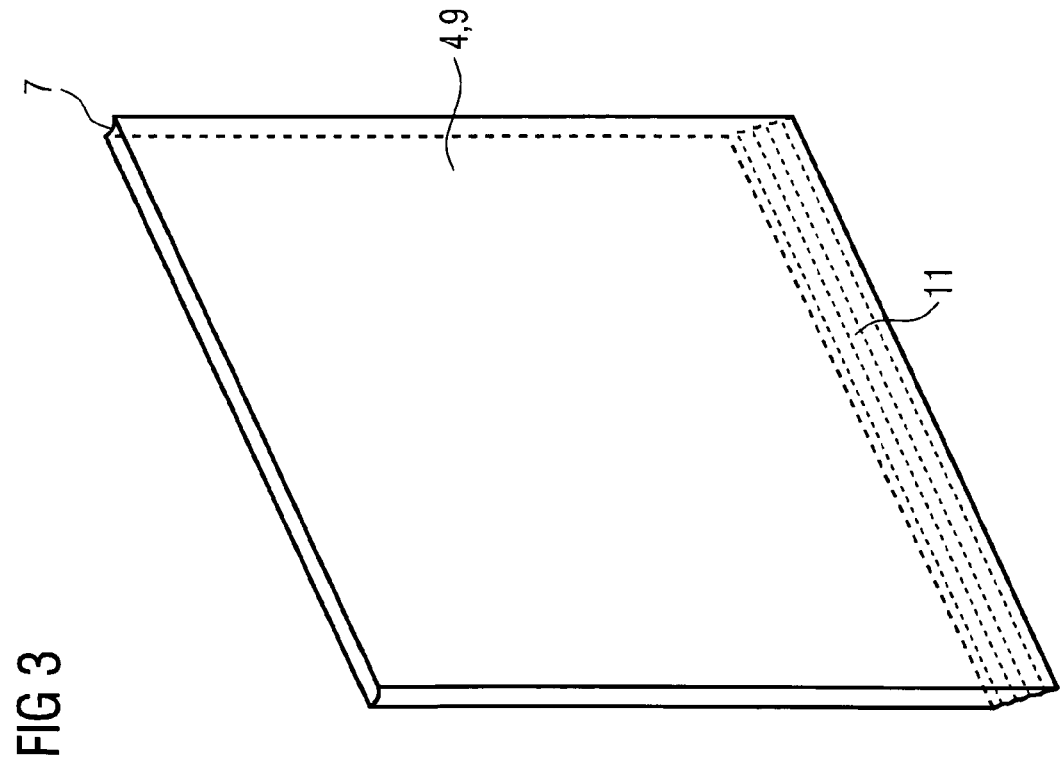

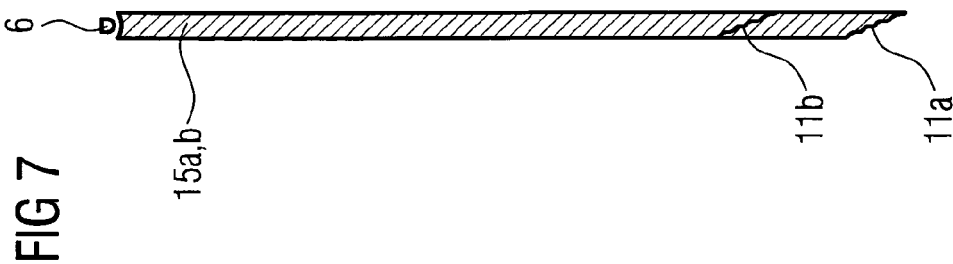
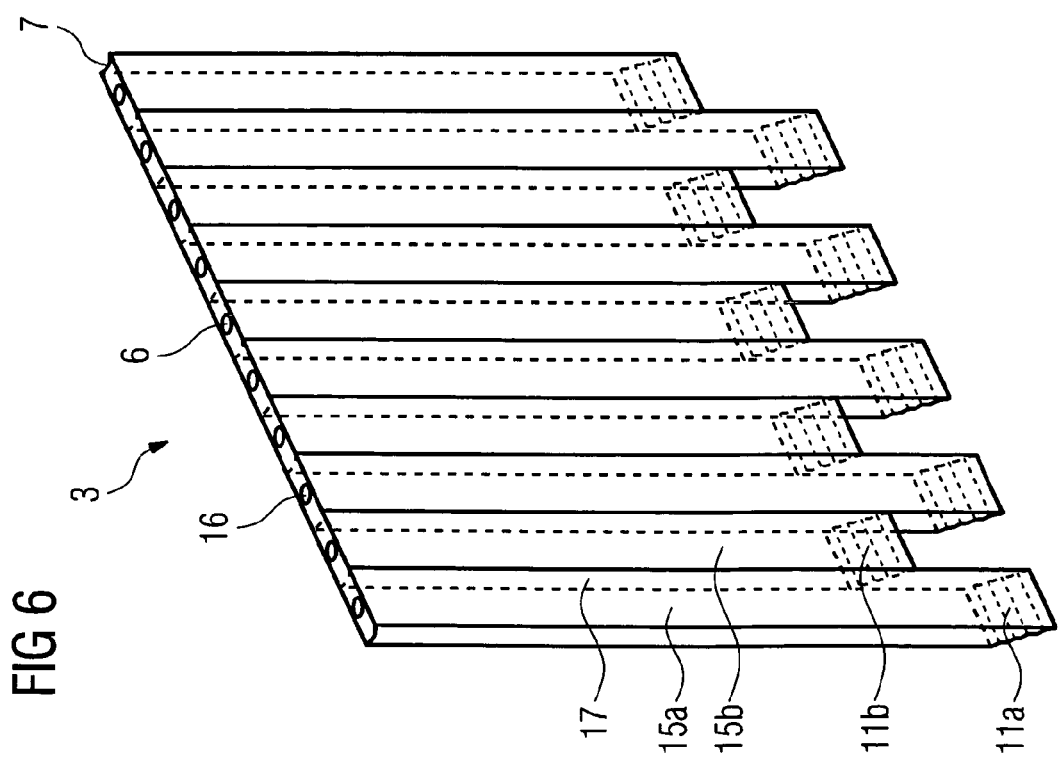

OVEN MUFFLE AND OVEN

The present application is directed to an oven muffle comprising a lighting system for illuminating the interior of the oven muffle and an oven comprising such an oven muffle.

An oven muffle comprising a lighting system for illuminating the interior of the oven muffle is known for example from DE 10 2005 045 367 A1. The known oven muffle is illuminated via the front door using a light guide and a mirror system for deflecting light propagating in the light guide into the oven muffle.

DE 103 01 078 A1 shows another oven muffle comprising a lighting system for guiding light into the oven muffle. The known oven muffle is illuminated via an outer enamel coating acting as a light guide.

It is an object of the invention to provide an alternative oven muffle comprising a lighting system for illuminating the interior of the oven muffle. In particular, an oven muffle comprising a lighting system shall be provided that assures good visual performance with respect to an adequate lighting level and preferably minimized glare. Further, a respective oven, preferably a baking oven, shall be provided.

This object is achieved by independent claims 1, and 13. Embodiments of the invention result from the dependent claims.

According to independent claim 1, an oven muffle comprising a lighting system for illuminating the interior of the oven muffle is provided. The oven muffle may be adapted for use with any kind of ovens, in particular baking ovens.

The lighting system comprises at least one light source, preferably an LED (light emitting diode) or LED array. The LED array may be of 1-dimensional, two-dimensional or three-dimensional type.

The lighting system further comprises at least one light guide which is attached to the outer surface of at least one of a lateral wall, a back and top wall of the oven muffle. Note that it is possible to attach one or several light guides to one or several of the aforementioned walls, if respective illumination preferences, probably depending inter alia on brightness requirements or the overall size of the oven muffle, so require. The light guide may be made of glass or other similar or suitable materials.

The light guide in turn comprises least one light guiding tube arranged and adapted to couple light from the at least one light source into the at least one light guiding tube at a light tube face side thereof. The light tube face side is considered to be located at a lateral face side of the light guide, i. e. a light guide face side. The light tube face side or light tube face sides may constitute the lateral face side of the light guide which will be a continuous light guide face side if the light tube face sides are arranged at equal levels. Note that in one configuration, the light guide may comprise only one light guiding tube, in which case the light guide acts as a light guiding tube. In another configuration, the light guide may comprise several distinct light guiding tubes arranged side-by-side.

Further, a respective light guiding tube extends in parallel to a light guiding direction along a respective wall from a light tube exit window facing at least one corresponding light entrance opening in the respective wall to its light tube face side. The light guiding direction is meant to represent the main direction of light propagation within the light guiding tube or light guide.

A light guiding tube is in particular understood to represent a cuboid, preferably strip-like, section of the light guide. Adjacent light guiding tubes in particular may be optically separated from each other, for example by walls, in particular mirrored walls. A light guiding tube thus may have a function of directing light emitted by a respective one or more light sources to a light tube exit window. Further, the light guiding tube may have a function of mixing light coupled into the light guiding tube from different light sources, in particular light sources of different colors. A light source comprising different colors may for example be an LED array comprising different colors such as red, green, blue, white and others if required. In particular with LED light sources it is possible to dim emitted light to adjust luminance or brightness to respective needs.

With the proposed oven muffle, it is possible to provide excellent, in particular bright, illumination of the interior of the oven muffle, or at least selected regions thereof. Hence objects, such as food items, placed in the oven muffle can properly be illuminated.

It is preferred that the light tube face side/s lie beyond a respective edge of the respective wall to which the light guide is mounted to. This has the advantage that heat sensitive light sources, such as LED's, can be used as they can be placed at some distance from the oven muffle. Hence, during operation of the oven muffle, in particular during baking, pyrolyis processes or other, less heat impinges on respective light sources as compared to positions at or near the oven muffle. An additional or alternative possibility to protect the light sources from over-heating is to place an insulating layer between a respective wall and the light guide, however preferably not covering respective light entrance windows.

With the proposed light guide and respective at least one light guiding tube it is in particular possible that in a direction transverse to the light guiding direction a respective light tube exit window extends at least over the whole width of a single light guiding tube or over the whole width of two or more adjacent light guiding tubes. The width of a light tube exit window shall mean the width in a direction transverse to the light guiding direction. Hence it is possible that each light guiding tube has its own light tube exit widow and that two or more, or even all light guiding tubes share a common light exit window.

In an embodiment at least two neighbouring light tube exit windows are offset from each other in a direction parallel to the light guiding direction. With such a configuration it is possible to direct light to different regions of the oven muffle. In particular it is possible that light is directed to different vertical height levels of the oven muffle. Here it is possible to specifically and satisfactory illuminate different baking levels which in general is desirable as conventional oven muffles have rays for inserting baking trays at different height levels with respect to the vertical.

In particular it is possible, that, with respect to a direction parallel to the light guiding direction, a first group of light tube exit windows is positioned at a first level and a second group of light tube exit windows is positioned at a second level offset from the first level. The first and second level may be adapted to respective baking tray levels, wherein the first and second levels preferably lie above the baking tray levels. Note that it is possible to provide light tube exit windows in more than just two different levels. In a special configuration within this embodiment the light tube exit windows can alternately belong to the first and second group with respect to the direction transverse to the light guiding direction. In particular in the latter case, nearly a uniform illumination over the whole width and/or depth of the oven muffle can be obtained for both levels. Note that the term level shall relate to a position in light guiding direction and corresponds to a height level if the light guiding direction is parallel to the vertical.

In a preferred embodiment, each light tube exit window comprises a deflection section, preferably of step-like design, designed for deflecting light towards the interior of the oven muffle,), in particular for deflecting light (10) about 80 to 100 degrees, preferably about 90 degrees. Such deflection angles have proven efficient in uniformly illuminating at least respective regions of the oven muffle.

Such a deflection section may, in an embodiment, comprise a mirror, preferably a glass mirror. In a preferred configuration, the mirror comprises several submirrors in a stepped arrangement. A mirror or submirror may be formed by a corresponding cut or grinding. Reflection coatings and the like may additionally be provided for maximizing lighting yield. In terms of the deflection angles identified above, a mirror face of a mirror and submirror may be slanted towards the oven muffle interior by 40 to 50 degrees, preferably by about 45 degrees. A respective mirror or submirror may have a planar or curved mirror face. Mirrors or respective cuts and the like are effective in nearly completely deflecting the light into the oven muffle without major losses. In particular the mirror/s and submirror/s can be adapted to minimize glare in particular with respect to a user inspecting the oven muffle interior from the outside through a front-side door window for example.

In a still further embodiment, adjacent light guiding tubes may be separated from each other by separating walls, such as septa. The separating walls may have mirrored surfaces facing respective light guiding tubes. It is preferred that in parallel to the light guiding direction respective mirrored surfaces extend from the respective light tube face side to the respective light tube exit window. With this configuration, light coupled into a respective light guiding tube can be specifically guided into the oven muffle interior. In particular it can be assured that propagation of light coupled into a respective light guiding tube is confined to that light guiding tube. This may be of relevance, if light guiding tubes are operated with different colors or brightness, because in this cases trans-light-tube light or color mixing can be prevented. It shall be mentioned, that it is also possible to mirror or mirror coat the overall inner wall or walls of a light guiding tube, preferably in order to obtain a maximum light yield and/or minimal inter-light-tube cross talk. In this context it shall further be mentioned that the cross section of a light tube can be of any geometry, in particular of polygonal, such as rectangular or triangular shape, or even oval or circular shape. In the latter cases, the light guiding tube in principle comprises one contiguous inner wall which may, at least partially, preferably entirely, be mirrored or mirror coated, which considerably improves light propagation within a respective light guiding tube.

Depending on the mounting position and mounting orientation of a light guide, it may be that in the ordinary operational state of the oven muffle, the light guiding direction of a respective light guide is parallel to the vertical direction in at least one of a top-down or bottom-up orientation, or parallel to the horizontal direction in a sidewall-to-sidewall or at least one of a front-to-back and back-to-front orientation. These configurations account for the fact that it is possible to place the light source or light sources at a top or bottom site, a back or front site or left or right site of the oven muffle. It is also possible to place light sources related to a single light guide both at a top and bottom site, both at a back and front side, and both at a left-hand and right-hand site.

In yet another embodiment it is provided that light tube face sides of the light guiding tubes define approximately a continuous light guide face side, that the lighting system comprises a set of light sources arranged in a row, in one dimensional (1D) array for example, along the light guide face side and that at least one light source is assigned to each light tube face side. Such a design makes it possible to attach the light source or light sources to the light guide in proper alignment with the light guide face side or light tube face sides.

In a further embodiment it may be provided that at least one light tube face side comprises a recess having a concave or convex bottom side. Here, the efficiency of coupling light into the light guide and light guiding tube, respectively, can be improved. If all light tube face sides of the light guiding tube comprise such a recess and the light tube face sides define a continuous light guide face side, the light guide as such has a corresponding continuous recess at its respective face side.

In an embodiment relating to the geometrical dimension of the light guide, light guiding tube or light guiding tubes, the thickness of respective light guiding tubes, preferably lies in the range of 0.5 cm to 2 cm, preferably about 1 cm, and basically remains constant along the light guiding direction. Preferably all light guiding tubes have basically equal thickness. Here, the thickness shall be understood to be measured in a direction normal to a respective oven muffle wall to which the light guide is attached to.

In a direction parallel to the light guiding direction a respective light guiding tube may have a length of 10 cm to 50 cm, 20 cm to 40 cm or of about 30 cm. The length may account for the distance between the light source, which may be arranged off or in a certain distance from the outer surface of the oven muffle, and a respective light exit window.

With further regard to geometrical dimensions, a further embodiment may provide that in a region of at least one light tube face side the thickness of the respective light guide first increases from about cm/mm to about . . . cm/mm and then decreases to about 0.5 cm to 2 cm, preferably about 1 cm, and subsequently remains constant over about the whole remaining length of the respective at least one light guiding tube. This has the advantage that the efficiency of coupling light into the light guide and light guiding tube, respectively, may be further improved, in particular of the light source has an enlarged light emission angle.

As can be seen, the proposed oven muffle and embodiments thereof provide good visual performance with respect to an adequate lighting level and preferably minimized glare.

According to independent claim 13, an oven which may be a baking oven or similar is provided. The oven comprises an oven muffle as proposed above, in particular according to any embodiment so far described in connection with the invention.

Embodiments of the invention will now be described in connection with the annexed figures, in which FIG. 1 shows a cross section of an oven muffle comprising a lighting system for illuminating the interior of the oven muffle;

FIG. 3 shows a perspective view of a light guide of the lighting system;

FIG. 4 shows a side view of the lighting system;

FIG. 6 shows a different embodiment of the lighting system; and

FIG. 7 shows a side view of the lighting system of FIG. 6.

The invention will be described in connection with an oven muffle of a baking oven. However, this shall not be construed as limiting the scope of the invention. Rather, the invention can be applied and used in connection with a variety of similar appliances.

If not otherwise stated like elements are denoted by like reference signs throughout the figures. The figures may not be true to scale, and scales of different figures may be different.

Figure 1:
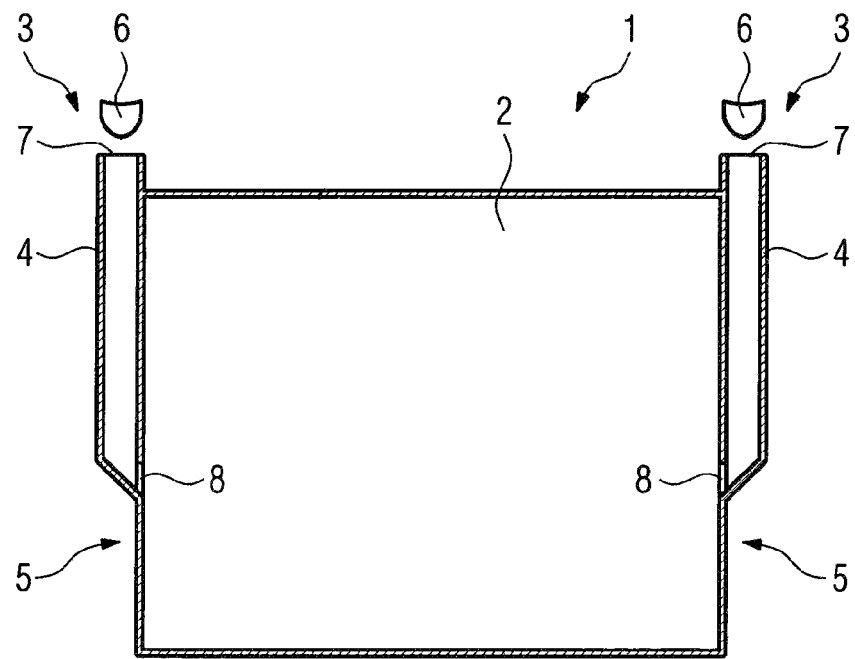

FIG. 1 shows in a front-to-back or back-to-front orientation a cross section of an oven muffle 1, wherein muffle walls thereof define an oven cavity 2. The oven muffle 1 comprises a lighting system 3 for illuminating the interior of the oven muffle 1, i. e. the oven cavity 2.

The lighting system 3 comprises two light guides 4 attached to respective opposing lateral side walls 5 of the oven muffle 1. Each light guide 3 is coupled with a light source 6 of the lighting system 3. In the present case, the respective light sources 6 are 1-dimensional arrays of LED's, preferably mounted on a common board. The light sources 6 are coupled to a light guide face side 7. The present light guides 4 are dimensioned and attached to the side walls 5 such that the light sources 6 lie above the top edge of the respective side walls 5, i. e. they lie beyond the respective edge.

At the face side averted from the light guide face side 4, the light guide 4 discharges light via a light entrance opening 8 provided at a preset vertical height level into the oven cavity 2. The vertical height level of the light entrance opening 8 is presently located in the mid-to-lower level of the oven cavity 2. However, other levels may be contemplated as described further above and below.

Further, locating the light sources 6 beyond the edges of respective walls, preferably as far off the oven walls as possible, has the advantage that the danger of overheating the light sources 6 during operation of the oven muffle 1 can be at least greatly minimized.

Figure 2:
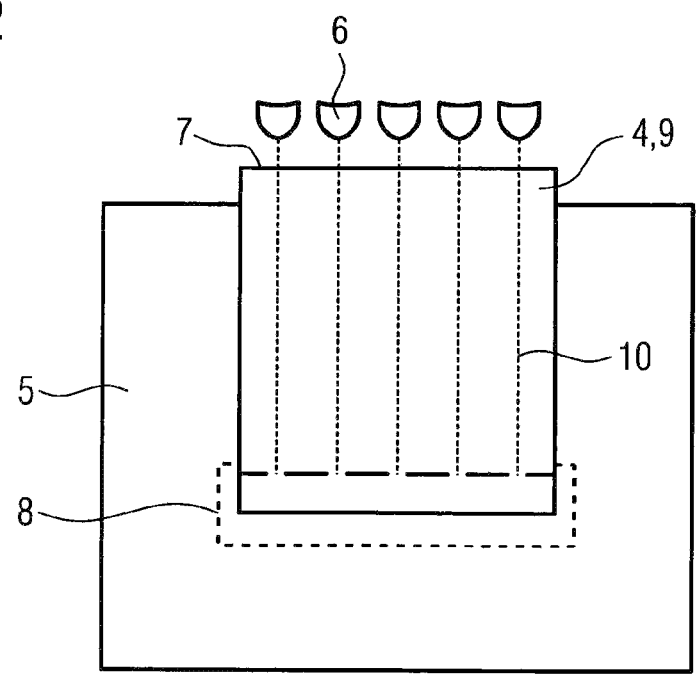
FIG. 2 shows a side view of the oven muffle of FIG. 1.

FIG. 2 shows a side view of the oven muffle of FIG. 1. As can be seen from FIG. 2, the light guide 4 in the present case makes up a single light guiding tube 9 extending in vertical and in horizontal direction along a section the side wall 5. The light guide 4 has a horizontal width that is about the same as the horizontal width of the light entrance opening 8. Light guided through the light guide is denoted with reference sign 10.

Further details of the light guide 4 are now described in connection with FIG. 3 and FIG. 4 a perspective view of the light guide 4 of the lighting system 3 and a side view of the lighting system 3, respectively.

As can be seen more clearly from FIG. 3 and FIG. 4, the light guide 4 comprises a slanted cut 11 at the face side averted from the light guide face side 7. The cut 11 is slanted by about 45 degrees with respect to the horizontal or vertical direction in order to deflect light 10 guided thereto via the light guide 4 towards the inner of the oven cavity 2. Therefore, the cut 11 acts as a kind of mirror or, alternatively acts as a reflection surface for internal or total internal reflection, the deflecting of reflecting efficiency may be improved by applying additional reflective foils and/or coatings.

The cut 11 or mirror can comprise several sub-cuts or submirrors defining a stepped mirror face allowing to increase the cone or deflection angle of deflected light. Thereby, enhanced illumination can be obtained over a larger volume of the oven cavity 2.

As can be seen, the respective light guide 4 can be easily mounted or attached to the wall 5 of the oven muffle 1. Further, the light guide 5 can be designed and constructed in a comparatively flat manner such that no excessive extra installation space will be required. In addition, the lighting system 3 can be used to replace lighting systems of state of the art oven muffles.

For lighting the oven cavity 2, the light sources 6 are powered, and light emitted therefrom is coupled into the light guide 4 via the light guide face side 4. The light 10 is guided through the light guide 4 and then hits the cut 11 which deflects the light 10 towards the oven cavity 2. Via the cut 11, the light 10 is directed and guided towards the light entrance opening 8 where it passes through and finally enters the oven cavity 2 for illuminating the same. By adequately adjusting and selecting the dimensions of the light source 6, the light guide 4, the cut 11 and the light entrance opening 8, the oven cavity 2 can be effectively illuminated. In particular a satisfying visual performance with respect to an adequate lighting level and preferably minimized glare can be obtained.

Figure 5:
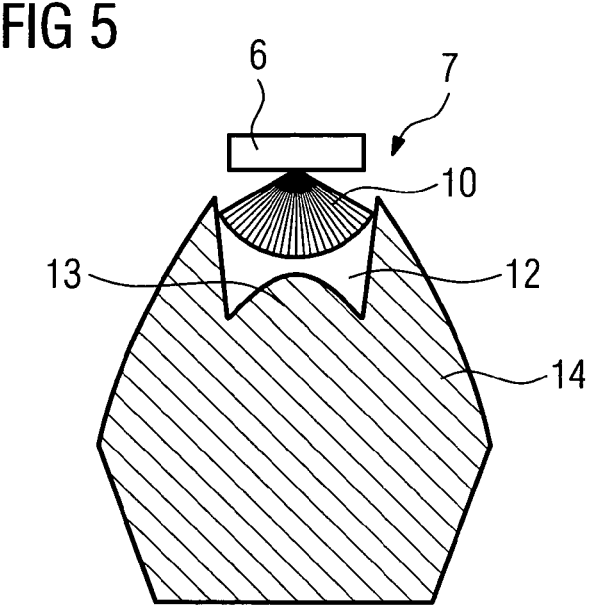
FIG. 5 shows a detail of an embodiment of the lighting system of FIG. 1 to FIG. 4.

FIG. 5 shows a detail of an embodiment of the lighting system of FIG. 1 to FIG. 4. The detail shown in FIG. 5 relates to the light guide face side 7. In contrast to the light guide face side 7 shown in connection with FIG. 1 to FIG. 4 which is in the form of a concavity bulging downwards and supporting the coupling of light 10 into the light guide 4, the present light guide face side 7 comprises a recess 12 having a convex bottom side 13, i. e. the bottom side 13 bulges upwards. Such a recess 12 may lead to enhanced coupling of light 10 into the light guide 4.

In order to enhance the processes of coupling light 10 into the light guide 4 and guiding, directing and focusing light 10 in light guiding direction L, the region near or at the light guide face side 7 comprises a thickened head section 14. The diameter or thickness of the thickened head section 14 first increases and then decreases to a diameter remaining constant over the whole remaining length of the light guide 4. Note that the term thickness shall be understood as defined further above. The thickness or diameter of the light guide 4 remaining constant can be in the range of 0.5 cm to 2 cm. Such values account for the fact that mounting space in general is restricted within a baking oven.

FIG. 6 shows a different embodiment of the lighting system 3, and FIG. 7 shows a side view thereof. The lighting system 3 differs from that of FIGS. 1 to 4 in that the light guide 4 is not just a single tube but comprises several light guiding tubes, of which only a representative first light guiding tube 15a and a representative second light guiding tube 15b are denoted for clarity reasons.

As can be seen, the light guide 4 comprises several pairs of first and second light guiding tubes 15a and 15b arranged side-to-side in a direction perpendicular to the light guiding direction.

An LED 16 is assigned to each of the first and second light guiding tubes 15a and 15b. Note that it is also possible to assign more than one LED 16 to each light guiding tube 15a and 15b, which LED's 16 may be of equal or different color and arranged in a 1-dimensional, 2-dimensional or 3-dimensional array.

The light guide face side 7, which in the present embodiment is composed of respective light tube face sides of the first and second light guiding tubes 15a and 15b, may be designed as described above. Note that in the present case the light tube face sides are designed and aligned to make up a continuous light guide face side 7.

Adjacent first and second light guiding tubes 15a and 15b are separated by separating walls or septa 17. The septa 17 and further the border side walls of the outer first light guiding tubes 15a have mirrored surfaces that reflect light 10 back into the first and second light guiding tubes 15a and 15b, respectively. In this way, light 10 coupled into a first or second light guiding tube 15a and 15b is confined to the respective light guiding tube so that there will be no mixing of light 10 from different light guiding tubes. This may be of importance if light 10 of different colors and/or brightness is coupled into adjacent light guiding tubes for example. In all, the septa 17 are effective if the oven cavity 2 shall locally be illuminated with different color shades and/or brightness.

A further difference to the light guide 4 of FIG. 1 to FIG. 4 is that two cuts, i. e. a first and second cut 11a and 11b are provided with respective first and second light guiding tubes 15a and 15b, respectively. The first and second cuts 11a and 11b comprise stepped submirrors as is the case with the cut 11 shown in FIG. 3 and FIG. 4. However, it shall be noted that the first and second cuts 11a and 11b need not have a stepped deflection face, but may also have even mirror faces or be of any other adequate design.

The first and second cuts 11a and 11b are positioned at different levels with respect to the light guiding direction L, i. e. at different height levels in the preset case. In this configuration light 10 can be directed to the oven cavity 2 at different height levels taking account of different baking levels generally provided with baking ovens. Hence, it is possible to specifically illuminate layers or partial layers of the inner volume of the oven cavity 2. Such a specific illumination may relate to specific brightness, specific color and the like, and may be selected according to the type of food item placed or to be placed at a respective baking level. In particular, it is possible to illuminate only the lower or upper volume of the oven cavity 2. Note that if the light sources 6 or LED's 16 are differently powered along the light guide face side 7 the lower and upper volumes additionally can be specifically illuminated with respect to the back-to-front or front-to-back direction. In alignment with the first and second cuts 11a and 11b, which by the way define light exit windows, there are provided respective light entrance windows in a respective side wall 5. Such light exit windows in the present case preferably extend over the whole width of a single first and second light guiding tube 15a and 15b. Here, the width shall be understood to relate to a direction transverse to the light guiding direction and in parallel to the respective side wall 5. Using such a light exit window design, a maximum light yield can be obtained. Light entrance windows 8 are flush with respective light exit windows and preferably have at least the same size as opposing light exit windows. Here, the light yield will not be reduced due to absorption of light 10 by the side wall surrounding the light entrance windows 8.

In the embodiment shown in FIG. 6 and FIG. 7, the first and second light guiding tubes 15a and 15b are arranged alternately. However it is also possible to consecutively arrange two or more first light guiding tubes 15a followed by a single or several consecutive second light guiding tubes 15b. In more general words, the sequence of first and second light guiding tubes 15a and 15b can arbitrarily be varied according to respective illumination requirements, needs or preferences.

As can be seen from the embodiments described above, it is possible to assure good visual performance with respect to an adequate lighting level and preferably minimized glare. Inter alia, this can be awarded to the possibility of providing selective illumination in particular with respect to at least one of brightness, color, baking levels, oven muffle volume or oven muffle partial volumes. Note that color and/or brightness and the like can be changed during operating the oven muffle 1, during baking foodstuff for example, to account for changing properties of the foodstuff during baking.

REFERENCE SIGNS 1 oven muffle
2 oven cavity
3 lighting system
4 light guide
5 side wall
6 light source
7 light guide face side
8 light entrance opening
9 light guiding tube
10 light
11 cut
11a first cut
11b second cut
12 recess
13 bottom side
14 thickened head section
15a first light guiding tube
15b second light guiding tube
16 LED
17 septum
L light guiding direction

The invention claimed is:

1. An oven muffle (1) comprising:
an enclosure defining an oven cavity; and
a lighting system (3) for illuminating the interior (2) of the enclosure, the lighting system (3) comprising at least one light source (6), at least one light guide (4) which is attached to an outer surface of a wall of the enclosure, and at least one light entrance opening (8) in the wall of the enclosure,
wherein the at least one light guide (4) comprises at least one light guiding tube (4; 15a, 15b) comprising a light guiding tube face side (7) and at least one light tube exit window (11; 11a, 11b) facing the at least one light entrance opening (8) in the wall of the enclosure, the at least one light guiding tube (4; 15a, 15b) being arranged and adapted to couple light (10) from the at least one light source (6) into the light guiding tube face side (7) thereof,
wherein the at least one light guiding tube (4; 15a, 15b) extends in a light guiding direction (L) parallel to the wall of the enclosure from the light tube exit window (11; 11a, 11b) to the light guiding tube face side (7), and
wherein the light guiding tube face side (7) comprises a recess (12) having a concave or convex bottom side (13).

2. The oven muffle (1) according to claim 1, wherein in a direction transverse to the light guiding direction (L) the light tube exit window (11; 11a, 11b) extends at least over a whole width of the at least one light guiding tube (4; 15a, 15b).

3. The oven muffle (1) according to claim 1, wherein the at least one light tube exit window (11; 11a, 11b) comprises a first light tube exit window (11a) and a second light tube exit window (11b), wherein first and second light tube exit windows (11a, 11b) are offset from each other in a direction parallel to the light guiding direction (L).

4. The oven muffle (1) according to claim 1, wherein the at least one light tube exit window (11; 11a, 11b) comprises a first group of light tube exit windows (11a) and a second group of light tube exit windows (11b), wherein with respect to a direction parallel to the light guiding direction (L) the first group of light guiding tube exit windows (11a) is positioned at a first level and the second group of light tube exit windows (11b) is positioned at a second level offset from the first level, wherein light tube exit windows (11a, 11b) of the first and second groups of light tube exit windows (11a, 11b) are alternately positioned in a direction transverse to the light guiding direction (L).

5. The oven muffle (1) according to claim 1, wherein the at least one light tube exit window (11; 11a, 11b) comprises a deflection section (11; 11a, 11b) having a step-like design configured to deflect light (10) towards the interior of the oven muffle (1) at an angle of about 80 to 100 degrees.

6. The oven muffle (1) according to claim 5, wherein the deflection section (11; 11a, 11b) comprises a mirror comprising a plurality of submirrors in a stepped arrangement.

7. The oven muffle (1) according to claim 1, wherein the at least one light guiding tube (4; 15a, 15b) comprises a first light guiding tube (15a) and a second light guiding tube (15b) adjacent to the first light guiding tube (15a) and separated therefrom by a separating wall (17), wherein the first and second light guiding tubes (15a, 15b) each comprise a corresponding light tube face side (7), corresponding light tube exit window (11a, 11b), and a mirrored surface that extends in parallel to the light guiding direction (L) from the corresponding light tube face side (7) to the corresponding light tube exit window (11a, 11b).

8. The oven muffle (1) according to claim 1, wherein in the ordinary operational state of the oven muffle (1), the light guiding direction (L) is parallel to a vertical direction or parallel to a horizontal direction.

9. The oven muffle (1) according to claim 1, wherein the at least one light guiding tube (4, 15a, 15b) comprises a plurality of light guiding tubes (4, 15a, 15b) comprising corresponding light guiding tube face sides that define a continuous light guide face side (7), wherein the at least one light source (6) comprises a plurality of light sources (6) arranged in a row along the continuous light guide face side (7) that correspond to the corresponding light guiding tube face sides.

10. A baking oven comprising an oven muffle (1) according to claim 1.

11. The oven muffle (1) according to claim 1, wherein a thickness of the at least one light guiding tube (4, 15a, 15b) lies in the range of 0.5 cm to 2 cm is substantially constant along the light guiding direction (L).

12. The oven muffle (1) according to claim 1, wherein in a direction from the light guiding tube face side (7) to the at least one light tube exit window (11; 11a, 11b), a thickness of the at least one light guide (4) first increases and then decreases to a decreased thickness that lies in the range of 0.5 cm to 2 cm and subsequently remains constant over about a whole remaining length of the at least one light guide (4).

13. An oven muffle (1) comprising:
an enclosure defining an oven cavity; and
a lighting system (3) for illuminating the interior (2) of the enclosure, the lighting system (3) comprising at least one light source (6), at least one light guide (4) which is attached to an outer surface of a wall of the enclosure, and at least one light entrance opening (8) in the wall of the enclosure,
wherein the at least one light guide (4) comprises at least one light guiding tube (4; 15a, 15b) comprising a light guiding tube face side (7) and at least one light tube exit window (11; 11a, 11b) facing the at least one light entrance opening (8) in the wall of the enclosure, the at least one light guiding tube (4; 15a, 15b) being arranged and adapted to couple light (10) from the at least one light source (6) into the light guiding tube face side (7) thereof,
wherein the at least one light guiding tube (4; 15a, 15b) extends in a light guiding direction (L) parallel to the wall of the enclosure from the light tube exit window (11; 11a, 11 b) to the light guiding tube face side (7), and
wherein in a direction from the light guiding tube face side (7) to the at least one light tube exit window (11; 11a, 11b), a thickness of the at least one light guide (4) first increases and then decreases to a decreased thickness that lies in the range of 0.5 cm to 2 cm and subsequently remains constant over about a whole remaining length of the at least one light guide (4).

14. An oven muffle (1) comprising:
an enclosure defining an oven cavity; and
a lighting system (3) for illuminating the interior (2) of the enclosure, the lighting system (3) comprising:
a first light source (16) and a second light source (16), and
at least one light guide (4) attached to an outer surface of a wall of the enclosure, the at least one light guide (4) comprising a first light guiding tube (15a) and a second light guiding tube (15b) arranged side-by-side,
wherein the first light guiding tube (15a) comprises a first light guiding tube face side (7) and a first light tube exit window (11a), the first light guiding tube (15a) being arranged and adapted to couple light (10) from the first light source (16) into the first light guiding tube face side (7) and through the first light exit window (11a) into the oven cavity,
wherein the second light guiding tube (15a) comprises a second light guiding tube face side (7) and a second light tube exit window (11b), the second light guiding tube (15b) being arranged and adapted to couple light (10) from the second light source (16) into the second light guiding tube face side (7) and through the first light exit window (11a) into the oven cavity,
wherein the first and second light guiding tubes (15a, 15b) extend in a light guiding direction (L) parallel to the wall of the enclosure, and
wherein with respect to the light guiding direction (L) the first light guiding tube exit window (11a) is positioned at a first level and the second light tube exit window (11b) is positioned at a second level offset from the first level.

15. The oven muffle (1) according to claim 14, wherein the first light source (16) and the second light source (16) are different colors.

* * * * *

UNITED STATES PATENT AND TRADEMARK OFFICE
CERTIFICATE OF CORRECTION

PATENT NO.       : 9,091,447 B2
APPLICATION NO.  : 13/696410
DATED            : July 28, 2015
INVENTOR(S)      : Giancarlo Arrigoni Page 1 of 1

It is certified that error appears in the above-identified patent and that said Letters Patent is hereby corrected as shown below:

In the claims,

Column 9, claim 11, line 33, please replace "2 cm is" with -- 2 cm and is --

Signed and Sealed this
Second Day of August, 2016

Michelle K. Lee
*Director of the United States Patent and Trademark Office*